US012789902B2

(12) United States Patent
Naruke

(10) Patent No.: US 12,789,902 B2
(45) Date of Patent: Nov. 10, 2026

(54) VEHICLE

(71) Applicant: SUBARU CORPORATION, Tokyo (JP)

(72) Inventor: Toshiaki Naruke, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 536 days.

(21) Appl. No.: 18/356,678

(22) Filed: Jul. 21, 2023

(65) Prior Publication Data

US 2024/0051605 A1 Feb. 15, 2024

(30) Foreign Application Priority Data

Aug. 10, 2022 (JP) ................................ 2022-127931

(51) Int. Cl.

*B60L 50/64* (2019.01)
*B60K 1/04* (2019.01)
*B60L 50/60* (2019.01)
*B62D 21/15* (2006.01)

(52) U.S. Cl.

CPC .............. *B62D 21/157* (2013.01); *B60K 1/04* (2013.01); *B60L 50/60* (2019.02)

(58) Field of Classification Search

CPC ...... B62D 21/157; B62D 21/15; B62D 50/60; B62D 50/64; B62L 50/60; B62L 50/64; B60K 1/04; B60K 2001/0405; B60K 2001/0438

See application file for complete search history.

(56) References Cited

U.S. PATENT DOCUMENTS 9,579,963 B2 * 2/2017 Landgraf ................. B60K 1/04
10,434,894 B2 * 10/2019 Li ........................... B60L 58/20
10,780,923 B2 * 9/2020 Caliskan ................ B60N 2/015
11,527,785 B2 * 12/2022 Taniuchi ............. H01M 10/658
11,688,909 B2 * 6/2023 Miloaga ................ H01M 50/28 429/100
2019/0015764 A1 1/2019 Partti
2021/0184279 A1 6/2021 Taniuchi et al.
2021/0305544 A1 9/2021 Miloaga et al.

FOREIGN PATENT DOCUMENTS

DE 102017214623 A1 * 2/2019 ....... B60K 15/03006
JP 2003-045392 A 2/2003
JP 2021-096936 A 6/2021

OTHER PUBLICATIONS

Notice of Reasons for Refusal mailed May 12, 2026 for Japanese Patent Application No. 2022-127931 (3 pages in Japanese; 4 page English translation).

* cited by examiner

*Primary Examiner* — John D Walters

(74) *Attorney, Agent, or Firm* — Smith, Gambrell & Russell, LLP

(57) ABSTRACT

A vehicle includes a motor, a first accommodation member, and a second accommodation member. The first accommodation member is configured to accommodate a first cell configured to supply electric power to the motor. The second accommodation member is configured to accommodate a second cell configured to supply electric power to the motor. The second accommodation member is disposed so as to cover at least a part of the first accommodation member. A strength of the first accommodation member is greater than a strength of the second accommodation member.

3 Claims, 9 Drawing Sheets

VEHICLE

CROSS-REFERENCE TO RELATED APPLICATIONS

The present application claims priority from Japanese Patent Application No. 2022-127931 filed on Aug. 10, 2022, the entire contents of which are hereby incorporated by reference.

BACKGROUND

The disclosure relates to a vehicle.

A known vehicle may include a motor and a battery for supplying electric power to the motor. For example, Japanese Unexamined Patent Application Publication No. 2021-96936 describes a battery pack mounted in a lower region of the vehicle.

SUMMARY

An aspect of the disclosure provides a vehicle including a motor, a first accommodation member, and a second accommodation member. The first accommodation member is configured to accommodate a first cell configured to supply electric power to the motor. The second accommodation member is configured to accommodate a second cell configured to supply electric power to the motor. The second accommodation member is disposed so as to cover at least a part of the first accommodation member. A strength of the first accommodation member is greater than a strength of the second accommodation member.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to describe the principles of the disclosure.

DETAILED DESCRIPTION

A battery mounted in a known vehicle typically includes a liquid cell, such as a Li-ion cell. When the Li-ion cell receives a collision load or an impact in, for example, a vehicle accident, an internal short circuit may occur due to deformation or damage. As a result, thermal runaway may occur, and the Li-ion cell may catch fire or explode. This may lead to a vehicle fire.

Accordingly, the vehicle including the battery including the Li-ion cell or the like may have a crushable zone or an energy absorption (EA) space around the battery, so that the battery receives less collision load and impact in case of a vehicle accident. In the following description, the crushable zone and the energy absorption space are generically referred to as an EA space. When the EA space is provided around the battery, the vehicle has a limited battery capacity, and therefore the range of the vehicle is reduced.

It is desirable to provide a vehicle capable of protecting the battery inside the EA space and having an increased range.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

First Embodiment

Figure 1:
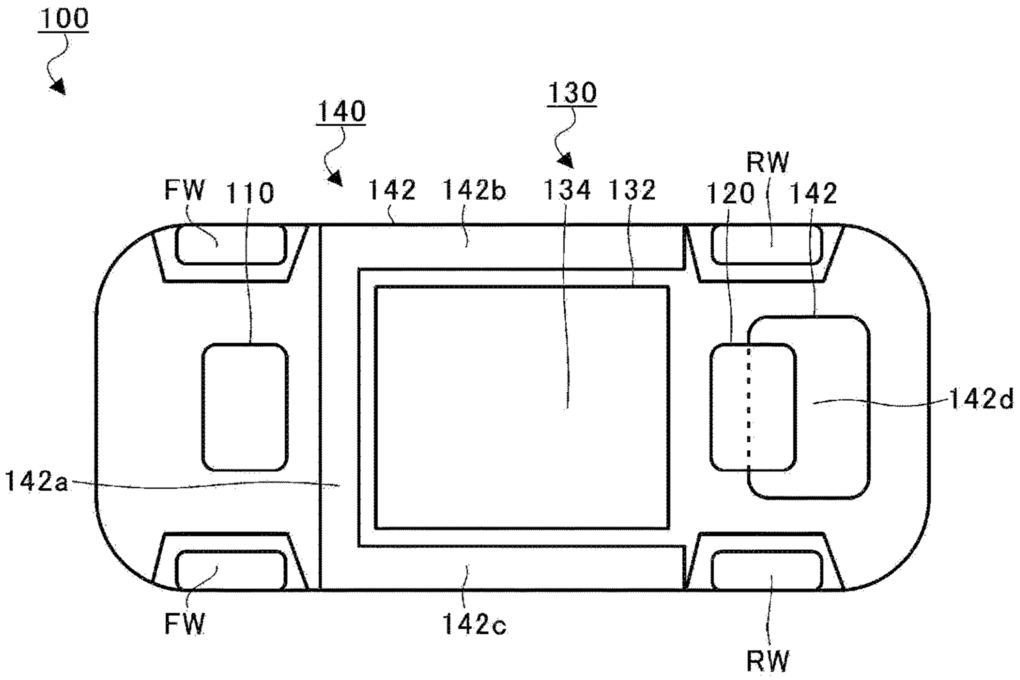
FIG. 1 is a schematic diagram illustrating the structure of a vehicle according to an embodiment.

FIG. 1 is a schematic diagram illustrating the structure of a vehicle 100 according to a first embodiment. In the present embodiment, the vehicle 100 is an electric automobile including motors as drive sources. The vehicle 100 is not limited to this, and may be a hybrid vehicle including an engine and a motor as drive sources.

As illustrated in FIG. 1, the vehicle 100 includes a front motor 110, a rear motor 120, a first battery unit 130, a second battery unit 140, front wheels FW, and rear wheels RW.

The front motor 110 is disposed between the front wheels FW of the vehicle 100 in a front region of the vehicle 100 in a direction in which the vehicle 100 travels (hereinafter referred to simply as a "front region"). The rear motor 120 is disposed between the rear wheels RW of the vehicle 100 in a rear region of the vehicle 100 in the direction in which the vehicle 100 travels (hereinafter referred to simply as a "rear region").

The front motor 110 and the rear motor 120 are coupled to the first battery unit 130 and the second battery unit 140 through inverters (not illustrated). The front motor 110 and the rear motor 120 convert electric power supplied from the first battery unit 130 and the second battery unit 140 into driving force.

The driving force of the front motor 110 is transmitted to the front wheels FW through a power transmission mechanism (not illustrated). The driving force of the rear motor 120 is transmitted to the rear wheels RW through a power transmission mechanism (not illustrated). The vehicle 100 is driven by the driving force.

Figure 2:
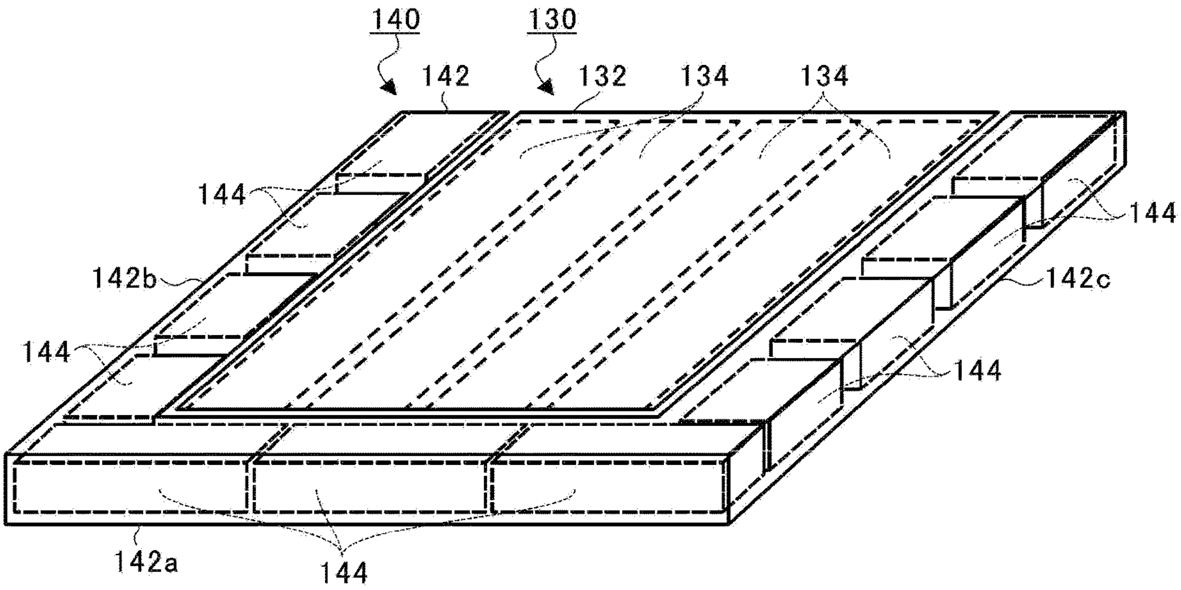
FIG. 2 is an enlarged perspective view of a first battery unit and a second battery unit.

FIG. 2 is an enlarged perspective view of the first battery unit 130 and the second battery unit 140. The first battery unit 130 and the second battery unit 140 are disposed, for example, under the floor of a vehicle body of the vehicle 100. The first battery unit 130 is disposed in an inner region of the vehicle body, and the second battery unit 140 is disposed closer to the outside of the vehicle body than the first battery unit 130. The second battery unit 140 is disposed to surround the first battery unit 130.

The first battery unit 130 includes a first case (first accommodation member) 132 and first cells 134. The first case 132 accommodates multiple first cells 134. However, the first case 132 is not limited to this, and may accommodate one first cell 134. The first cells 134 supply electric power to the front motor 110 and the rear motor 120. The first cells 134 are, for example, liquid cells, such as Li-ion cells. However, the first cells 134 are not limited to this, and may be, for example, solid-state cells, such as all-solid-state cells.

The second battery unit 140 includes a second case (second accommodation member) 142 and second cells 144. The second case 142 includes a front member 142*a*, a right side member 142*b*, a left side member 142*c*, and a rear member 142*d* (see FIG. 1), which are respectively positioned in front of, on the right and left sides of, and behind the first battery unit 130 in the vehicle 100. The first case 132 is disposed in an inner region of the vehicle body, and the second case 142 is disposed closer to the outside of the vehicle body than the first case 132. The second case 142 is disposed to surround the first case 132.

The front, right, left, and rear sides of the first battery unit 130 are surrounded by the front member 142*a*, the right side member 142*b*, the left side member 142*c*, and the rear member 142*d* of the second case 142. The first case 132 of the first battery unit 130 is positioned closer to the back of the vehicle 100 than the front member 142*a* of the second case 142, closer to the front of the vehicle 100 than the rear member 142*d*, and between the right side member 142*b* and the left side member 142*c*.

In the first embodiment, the front member 142*a*, the right side member 142*b*, and the left side member 142*c* of the second case 142 are separate from the rear member 142*d*. However, the front member 142*a*, the right side member 142*b*, the left side member 142*c*, and the rear member 142*d* may be permanently affixed to each other. Alternatively, the front member 142*a*, the right side member 142*b*, the left side member 142*c*, and the rear member 142*d* of the second case 142 may be separate from each other.

The second case 142 may be composed of one or more of the front member 142*a*, the right side member 142*b*, the left side member 142*c*, and the rear member 142*d*. For example, the second case 142 may be composed of the front member 142*a*. Alternatively, the second case 142 may be composed of the right side member 142*b*, the left side member 142*c*, or the right side member 142*b* and the left side member 142*c*. Alternatively, the second case 142 may be composed of the rear member 142*d*. Thus, according to the present embodiment, the second case 142 is provided to at least partially surround the first case 132.

The second case 142 accommodates multiple second cells 144. However, the second case 142 is not limited to this, and may accommodate one second cell 144. The second cells 144 supply electric power to the front motor 110 and the rear motor 120. The first cells 134 and the second cells 144 are electrically coupled in parallel to each other, and are individually provided with relays that are independently disconnectable.

Each second cell 144 is a solid-state cell, such as an all-solid-state cell. In the present embodiment, each second cell 144 is composed of the all-solid-state cell. The all-solid-state cell includes a fire-resistant solid electrolyte instead of a combustible electrolytic solution included in a liquid cell, and is less likely to catch fire than the liquid cell in case of a vehicle accident. The electrolyte of the liquid cell may include liquid or polymer gel electrolytes like the combustible electrolytic solution. Whereas, the electrolyte of the all-solid-state cell may consist of solid electrolyte, may include neither liquid nor polymer gel electrolytes. Therefore, compared to the liquid cell, the all-solid-state cell is more resistant to deformation and damage caused by an impact and a collision load in a vehicle accident, and is safer.

Accordingly, in the present embodiment, the second battery unit 140 including the all-solid-state cells is disposed in the EA space surrounding the first battery unit 130, so that the first battery unit 130 including the liquid cells receives less collision load and impact in case of a vehicle accident.

When the vehicle 100 is not in an accident, the second battery unit 140 supplies electric power to the front motor 110 and the rear motor 120 together with the first battery unit 130. Therefore, compared to when the vehicle 100 mainly includes the first battery unit 130, the battery capacity of the vehicle 100 can be increased, and the range of the vehicle 100 can be increased accordingly. When a vehicle accident occurs, the second battery unit 140 serves as an energy absorption member to protect the first battery unit 130 from the impact load and the impact. When the second cells 144 are damaged due to a vehicle collision, the second cells 144 are disconnected by the relays (not illustrated), and the first cells 134 supply electric power for driving the vehicle 100 to the front motor 110 and the rear motor 120. Thus, even when the second cells 144 are damaged, the vehicle 100 can be continuously driven by the first cells 134.

Figure 3A:
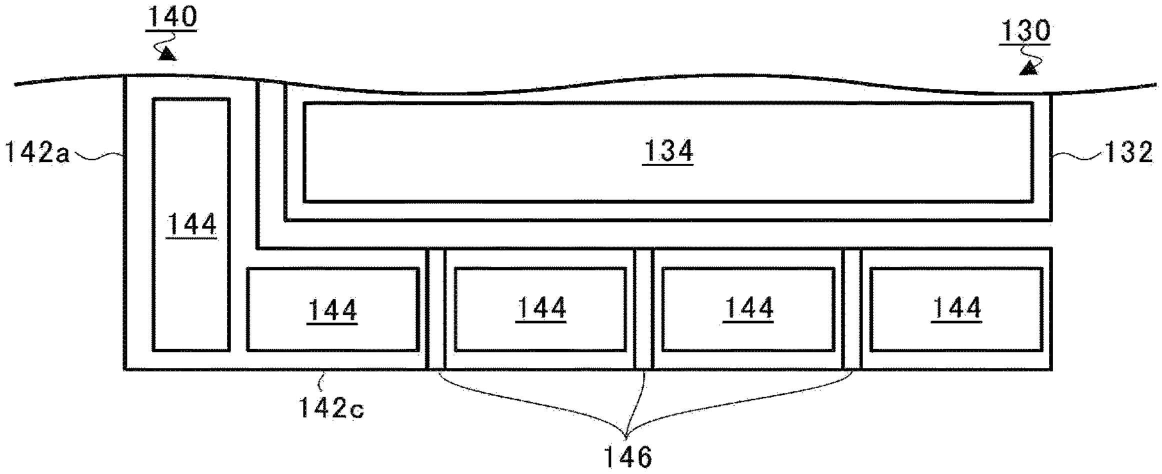
FIG. 3A is a horizontal sectional view of the first battery unit and the second battery unit before the vehicle is involved in a collision.
Figure 3B:
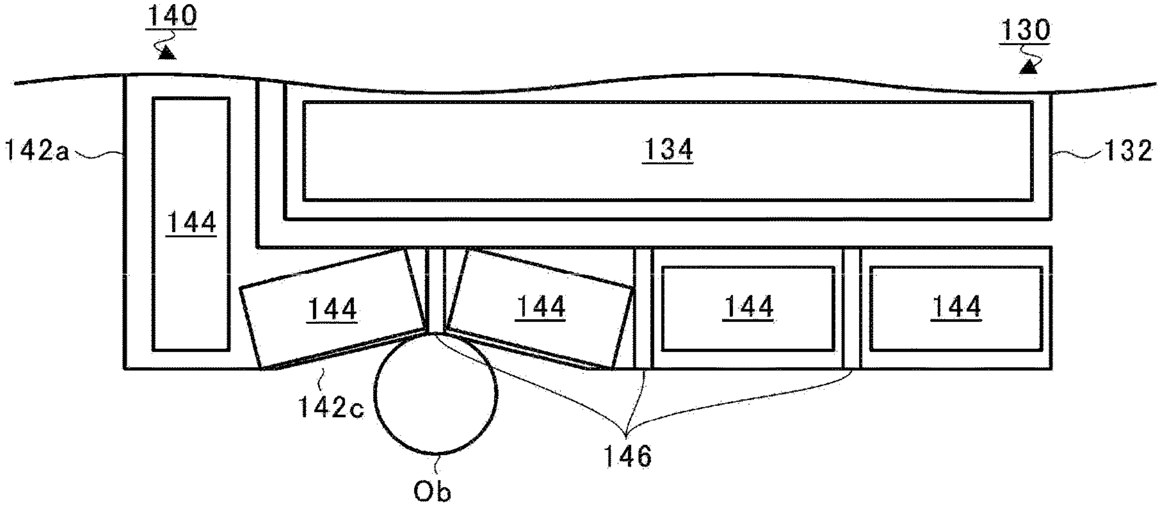
FIG. 3B is a horizontal sectional view of the first battery unit and the second battery unit after the vehicle is involved in a collision.

FIG. 3A is a horizontal sectional view of the first battery unit 130 and the second battery unit 140 before the vehicle 100 is involved in a collision. FIG. 3B is a horizontal sectional view of the first battery unit 130 and the second battery unit 140 after the vehicle 100 is involved in a collision.

FIG. 3B illustrates the manner in which the vehicle 100 collides with an object Ob. The object Ob moves upward in FIG. 3B, which is a left-to-right direction for the vehicle

100, and collides with the left side of the vehicle 100. As illustrated in FIG. 3B, when a vehicle accident occurs, the object Ob hits the second battery unit 140 before hitting the first battery unit 130. Accordingly, when a vehicle accident occurs, first, the second battery unit 140 receives a collision load and an impact from the object Ob. When the second battery unit 140 receives the collision load and the impact, the second case 142 is deformed, and the gap between the second case 142 and the second cells 144 is reduced, so that the impact energy is partially absorbed and reduced. When the second case 142 is deformed and when the gap between the second case 142 and the second cells 144 is reduced, the entrance acceleration of the object Ob is reduced, and the impact load is reduced accordingly.

As illustrated in FIGS. 3A and 3B, energy absorption members (first energy absorption members) 146 are disposed in the second case 142. The energy absorption members 146 are disposed between the second cells 144. The energy absorption members 146 serve as beams of the second case 142 to increase the strength of the second case 142. The collision load and the impact applied by the object Ob are transmitted to the energy absorption members 146 in the second case 142. When the energy absorption members 146 receive the collision load and the impact, the energy absorption members 146 are deformed, so that the impact energy is partially absorbed and reduced. When the energy absorption members 146 are deformed and crushed, the entrance acceleration of the object Ob is reduced, and the impact load is reduced accordingly.

In the present embodiment, the second cells 144 that are separate from each other are provided in the second case 142, and the energy absorption members 146 are provided between the second cells 144. Therefore, the collision load and the impact applied by the object Ob are absorbed and reduced when the gap between the second case 142 and the second cells 144 is reduced and when the energy absorption members 146 are crushed before the second cells 144 are crushed. If the collision load and the impact applied by the object Ob can be entirely absorbed as a result of the reduction in the gap between the second case 142 and the second cells 144 and the crushing of the energy absorption members 146, the second cells 144 can be protected.

If the collision load and the impact applied by the object Ob cannot be entirely absorbed as a result of the reduction in the gap between the second case 142 and the second cells 144 and the crushing of the energy absorption members 146, the collision load and the impact are partially transmitted to the second cells 144. When the second cells 144 receive the collision load and the impact, the second cells 144 are deformed and crushed, so that the collision load and the impact energy are partially absorbed and reduced.

If the collision load and the impact applied by the object Ob cannot be entirely absorbed as a result of the crushing of the second cells 144, the second battery unit 140 moves toward the first battery unit 130. In such a case, the second battery unit 140 comes into contact with the first battery unit 130, and the collision load and the impact are partially applied to the first battery unit 130 through the second battery unit 140. The transmission path along which the collision load and the impact are applied to the first battery unit 130 through the second battery unit 140 will now be described with reference to FIGS. 4A and 4B.

Figure 4A:
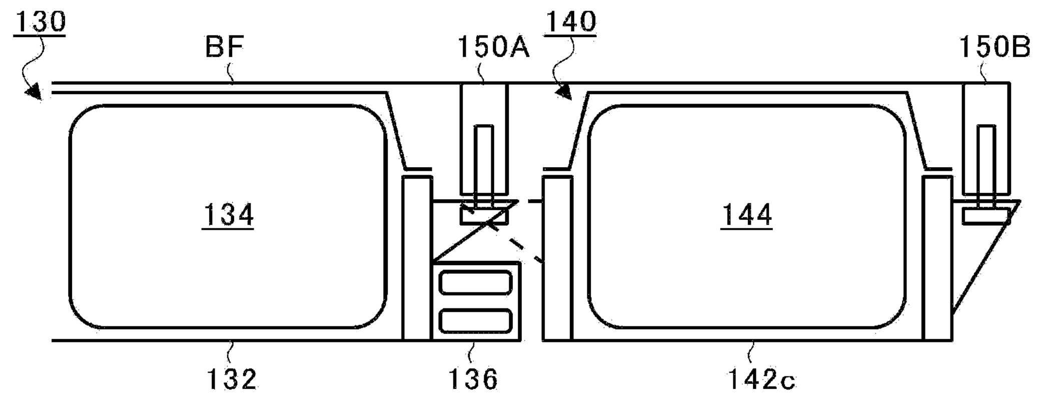
FIG. 4A is a vertical sectional view of the first battery unit and the second battery unit before the vehicle is involved in a collision.
Figure 4B:
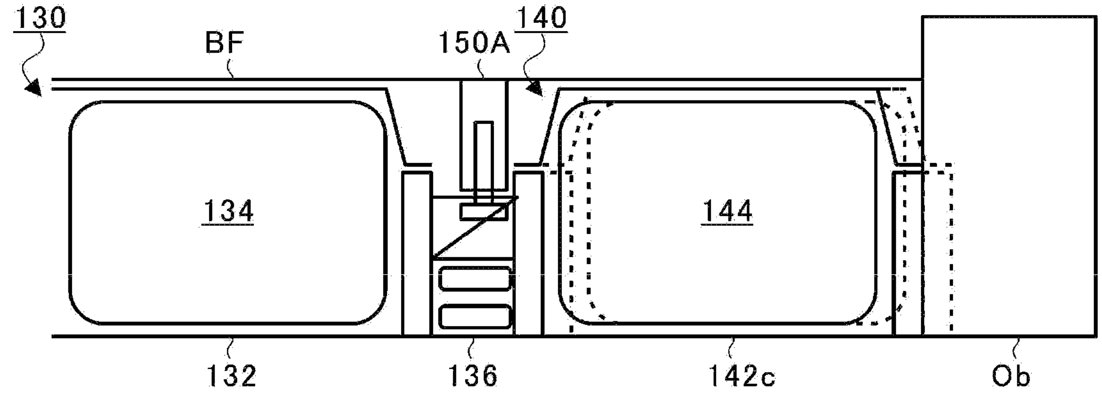
FIG. 4B is a vertical sectional view of the first battery unit and the second battery unit after the vehicle is involved in a collision.

FIG. 4A is a vertical sectional view of the first battery unit 130 and the second battery unit 140 before the vehicle 100 is involved in a collision. FIG. 4B is a vertical sectional view of the first battery unit 130 and the second battery unit 140 after the vehicle 100 is involved in a collision. FIGS. 3A and 3B and FIGS. 4A and 4B are horizontal sectional views and vertical sectional views, respectively, of the same first battery unit 130 and the same second battery unit 140 according to the first embodiment. FIGS. 3A and 3B illustrate a case in which the collision load and the impact applied by the object Ob can be absorbed as a result of the deformation of the second battery unit 140. FIGS. 4A and 4B illustrate a case in which the collision load and the impact applied by the object Ob cannot be absorbed as a result of the deformation of the second battery unit 140.

As illustrated in FIGS. 4A and 4B, the first battery unit 130 and the second battery unit 140 are suspended from a vehicle floor BF by a first vehicle frame 150A and a second vehicle frame 150B. The first vehicle frame 150A is disposed in an inner region of the vehicle body, and the second vehicle frame 150B is disposed in an outer region of the vehicle body. The first vehicle frame 150A is, for example, a frame that constitutes a vehicle framework to ensure sufficient strength of the vehicle body. The second vehicle frame 150B is, for example, a member that serves as an EA unit of a side sill or the like. The first vehicle frame 150A joins the vehicle floor BF and the first case 132 together with a joining member. The second vehicle frame 150B joins the vehicle floor BF and the second case 142 together with a joining member.

Energy absorption members (second energy absorption members) 136 are provided on an outer surface of the first case 132. The energy absorption members 136 are not limited to this, and may be provided on an outer surface of the second case 142. The energy absorption members 136 are disposed directly below the vehicle frame 150A and between the first case 132 and the second case 142.

Referring to FIG. 4B, the object Ob moves in a right-to-left direction in FIG. 4B, which is a left-to-right direction for the vehicle 100, and collides with the left side of the vehicle 100. As described above in detail with reference to FIGS. 3A and 3B, first, the collision load and the impact applied by the object Ob are partially absorbed and reduced as a result of the reduction in the gap between the second case 142 and the second cells 144 and the deformation and crushing of the energy absorption members 146 and the second cells 144. Then, when the second battery unit 140 moves toward the first battery unit 130 as illustrated in FIG. 4B, the second battery unit 140 hits the energy absorption members 136, and the collision load and the impact applied by the object Ob are transmitted to the energy absorption members 136. When the energy absorption members 136 receive the collision load and the impact, the energy absorption members 136 are deformed, so that the impact energy is partially absorbed and reduced. When the energy absorption members 136 are deformed and crushed, the entrance acceleration of the object Ob is reduced, and the impact load is reduced accordingly.

When the second battery unit 140 moves toward the first battery unit 130, the second battery unit 140 hits the first battery unit 130 with the energy absorption members 136 disposed therebetween. The collision load and the impact that have not been absorbed by the crushing of the energy absorption members 136 are transmitted to the first vehicle frame 150A through the first case 132 of the first battery unit 130. In the present embodiment, the strength of the first case 132 is greater than the strength of the second case 142. Therefore, when the collision load is applied from the second case 142 to the first case 132 through the energy absorption members 136, the first case 132 is less likely to be deformed than the second case 142, and the first cells 134 can be protected from damage.

The collision load and the impact transmitted to the first case 132 through the energy absorption members 136 are transmitted to the first vehicle frame 150A through the joining member. The collision load and the impact transmitted to the first vehicle frame 150A are reduced by, for example, the overall motion of the vehicle body including roll motion of the vehicle body; deformations of the front wheels FW, the rear wheels RW, and suspensions; and side slip of the vehicle body.

As described above, in the first embodiment, the second battery unit 140 including the all-solid-state cells is disposed in the EA space surrounding the first battery unit 130, so that the first battery unit 130 including the liquid cells receives less collision load in case of a vehicle accident. The second battery unit 140 is provided along the outer periphery of the first battery unit 130 to at least partially surround the first battery unit 130. In one embodiment, the first case 132 is disposed in an inner region of the vehicle body, and the second case 142 is disposed closer to the outside of the vehicle body than the first case 132. The second case 142 is provided along the outer periphery of the first case 132 to at least partially surround the first case 132.

Since the second battery unit 140 is provided in the EA space, the battery capacity of the vehicle 100 can be increased, and the range of the vehicle 100 can be increased accordingly. Even when the second battery unit 140 is damaged due to, for example, a collision, the damaged second battery unit 140 may be replaced without replacing the first battery unit 130 that has been protected. Therefore, repair costs can be reduced.

The first embodiment is characterized in that the strength of the first case 132 is greater than the strength of the second case 142. Accordingly, even when the collision load is applied from the second case 142 to the first case 132, the first case 132 is less likely to be deformed than the second case 142, and the first cells 134 can be protected from damage.

Second Embodiment

Figure 5:
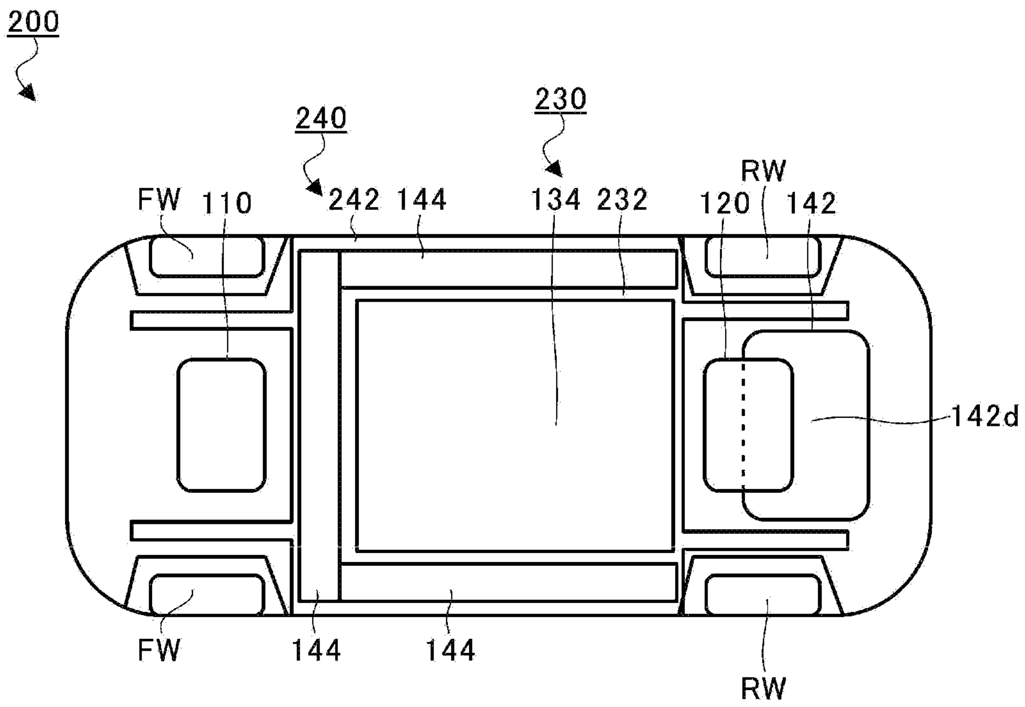
FIG. 5 is a schematic diagram illustrating the structure of a vehicle according to an embodiment.
Figure 6A:
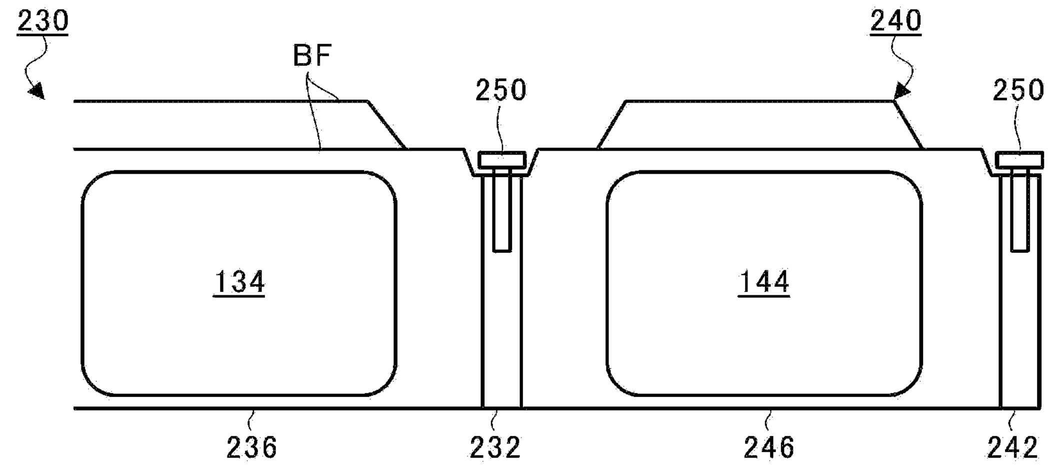
FIG. 6A is a vertical sectional view of a first battery unit and a second battery unit according to the embodiment before collision.
Figure 6B:
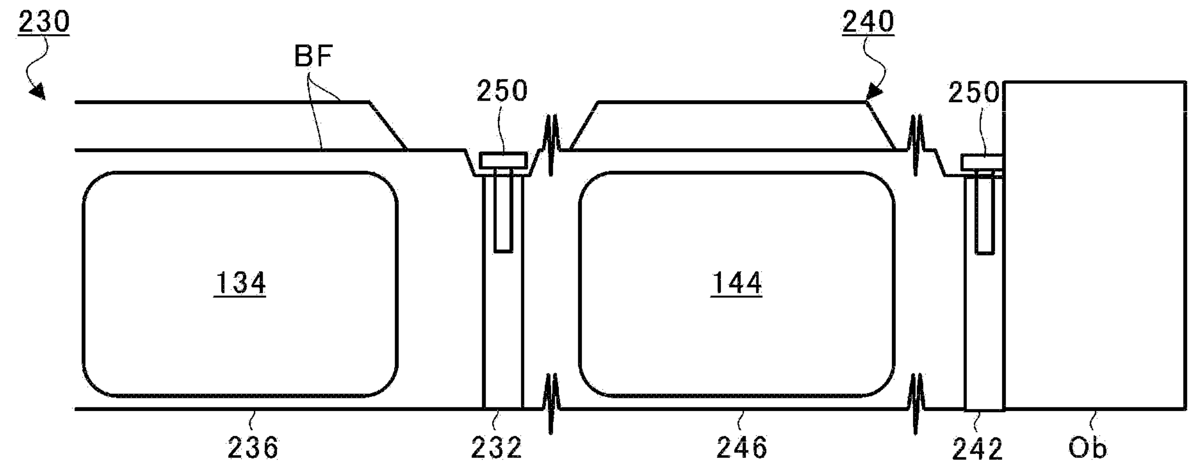
FIG. 6B is a vertical sectional view of the first battery unit and the second battery unit according to the embodiment after collision.

FIG. 5 is a schematic diagram illustrating the structure of a vehicle 200 according to a second embodiment. FIG. 6A is a vertical sectional view of a first battery unit 230 and a second battery unit 240 according to the second embodiment before collision. FIG. 6B is a vertical sectional view of the first battery unit 230 and the second battery unit 240 according to the second embodiment after collision. Components substantially the same as those of the vehicle 100 according to the first embodiment are denoted by the same reference numerals, and description thereof is omitted. The vehicle 200 according to the second embodiment includes the first battery unit 230 that differs from the first battery unit 130 according to the first embodiment and the second battery unit 240 that differs from the second battery unit 140 according to the first embodiment.

Referring to FIGS. 5, 6A, and 6B, the first battery unit 230 includes a first frame (first accommodation member) 232, a first lower cover 236, and first cells 134. The second battery unit 240 includes a second frame (second accommodation member) 242, a second lower cover 246, and second cells 144.

The first battery unit 230 and the second battery unit 240 are, for example, attached to a vehicle floor BF of the vehicle 200. The first battery unit 230 is disposed in an inner region of the vehicle body, and the second battery unit 240 is disposed closer to the outside of the vehicle body than the first battery unit 230. The second battery unit 240 is provided to at least partially surround the first battery unit 230. In one embodiment, the first frame 232 is disposed in an inner region of the vehicle body, and the second frame 242 is disposed closer to the outside of the vehicle body than the first frame 232. The second frame 242 is provided along the outer periphery of the first frame 232 to at least partially surround the first frame 232.

The first battery unit 230 according to the second embodiment includes the first frame 232 and the first lower cover 236 instead of the first case 132 of the first battery unit 130 according to the first embodiment. The second battery unit 240 according to the second embodiment includes the second frame 242 and the second lower cover 246 instead of the second case 142 according to the first embodiment.

The first frame 232 may serve as a part of a vehicle frame that constitutes a vehicle framework of the vehicle 200. The first frame 232 is coupled to the vehicle floor BF by a fastening member 250, so that the first battery unit 230 according to the second embodiment is suspended from the vehicle floor BF. The second frame 242 may serve as, for example, an EA unit of a side sill or the like. The second frame 242 is coupled to the vehicle floor BF by another fastening member 250, so that the second battery unit 240 according to the second embodiment is suspended from the vehicle floor BF.

The first cells 134 are accommodated in an accommodation space surrounded by the first frame 232, the vehicle floor BF, and the first lower cover 236. The second cells 144 are accommodated in an accommodation space surrounded by the first frame 232, the second frame 242, the vehicle floor BF, and the second lower cover 246.

Referring to FIG. 6B, an object Ob moves in a right-to-left direction in FIG. 6B, which is a left-to-right direction for the vehicle 200, and collides with the left side of the vehicle 200. As illustrated in FIG. 6B, when a vehicle accident occurs, the object Ob hits the second battery unit 240 before hitting the first battery unit 230. Accordingly, when a vehicle accident occurs, first, the second battery unit 240 receives a collision load and an impact from the object Ob. When the second battery unit 240 receives the collision load and the impact, the second frame 242 is deformed and the gap between the second frame 242 and the second cells 144 is reduced, so that the impact energy is partially absorbed and reduced. When the second frame 242 is deformed and when the gap between the second frame 242 and the second cells 144 is reduced, the entrance acceleration of the object Ob is reduced, and the impact load is reduced accordingly.

If the collision load and the impact applied by the object Ob cannot be entirely absorbed as a result of the reduction in the gap between the second frame 242 and the second cells 144, the collision load and the impact are partially transmitted to the second cells 144. When the second cells 144 receive the collision load and the impact, the second cells 144 are deformed and crushed, so that the collision load and the impact energy are partially absorbed and reduced.

When the collision load and the impact cannot be entirely absorbed as a result of the crushing of the second cells 144, the collision load and the impact are transmitted to the first frame 232 of the first battery unit 230. In one embodiment, the first frame 232 may serve as the vehicle frame. In the present embodiment, the strength of the first frame 232 is greater than the strength of the members of the second battery unit 240. Therefore, when the collision load is applied from the second battery unit 240 to the first frame 232, the first frame 232 is less likely to be deformed than the second battery unit 240, and the first cells 134 can be protected from damage.

The collision load and the impact transmitted from the second battery unit 240 to the first frame 232 that serves as the vehicle frame are reduced by, for example, the overall motion of the vehicle body including roll motion of the vehicle body; deformations of the front wheels FW, the rear wheels RW, and suspensions; and side slip of the vehicle body.

Also in the second embodiment, the second battery unit 240 including the all-solid-state cells is disposed in the EA space surrounding the first battery unit 230, so that the first battery unit 230 including the liquid cells receives less collision load and impact in case of a vehicle accident. The second battery unit 240 is provided along the outer periphery of the first battery unit 230 to surround the first battery unit 230.

Since the second battery unit 240 is provided in the EA space, the battery capacity of the vehicle 200 can be increased, and the range of the vehicle 200 can be increased accordingly. Even when the second battery unit 240 is damaged due to, for example, a collision, the damaged second battery unit 240 may be replaced without replacing the first battery unit 230 that has been protected. Thus, repair costs can be reduced.

The second embodiment is characterized in that the first frame 232 serves as a part of the vehicle frame of the vehicle 200 and has a strength sufficient to serve as the vehicle frame. Accordingly, even when the collision load is applied from the second battery unit 240 to the first frame 232, the first frame 232 is less likely to be deformed than the second battery unit 240, and the first cells 134 can be protected from damage.

In the second embodiment, the space between the first cells 134 and the second cells 144 is partitioned by one frame, that is, the first frame 232. However, the structure is not limited to this, and the space between the first cells 134 and the second cells 144 may be partitioned by more than one frames. An example in which the space between the first cells 134 and the second cells 144 is partitioned by more than one frames will be described with reference to FIGS. 7A and 7B as a third embodiment, which is a modification of the second embodiment.

Third Embodiment

Figure 7A:
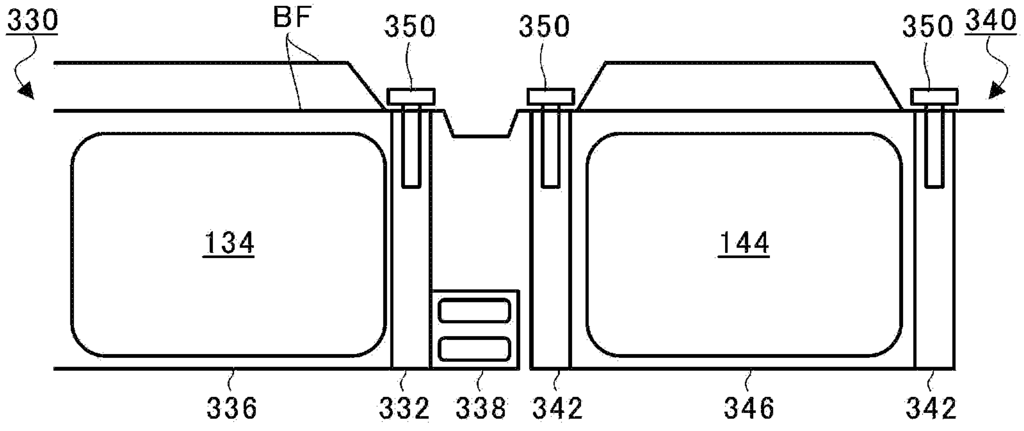
FIG. 7A is a vertical sectional view of a first battery unit and a second battery unit according to an embodiment before collision.
Figure 7B:
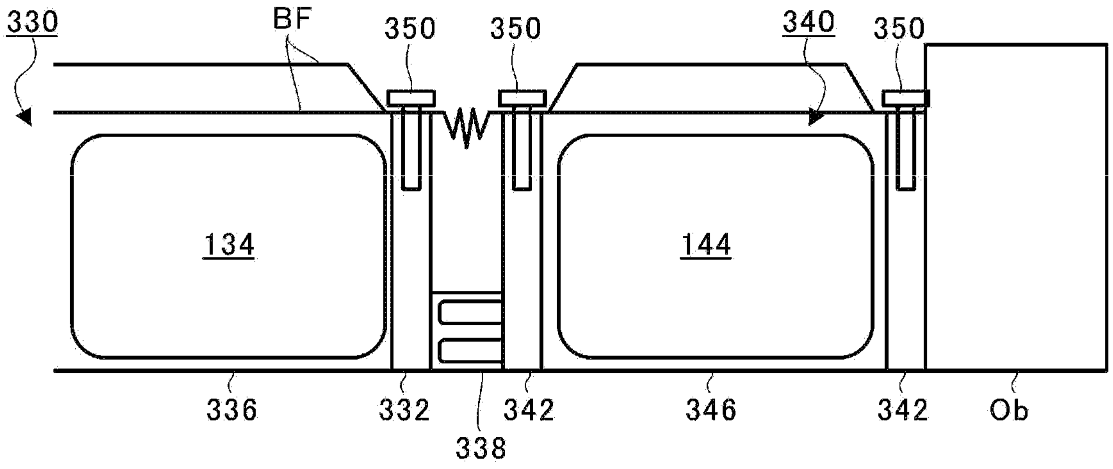
FIG. 7B is a vertical sectional view of the first battery unit and the second battery unit according to the embodiment after collision.

FIG. 7A is a vertical sectional view of a first battery unit 330 and a second battery unit 340 according to the third embodiment before collision. FIG. 7B is a vertical sectional view of the first battery unit 330 and the second battery unit 340 according to the third embodiment after collision. The third embodiment is a modification of the second embodiment, and structures thereof other than the structures of the first battery unit 330 and the second battery unit 340 are the same as those of the second embodiment. Components substantially the same as those of the vehicle 200 according to the second embodiment are denoted by the same reference numerals, and description thereof is omitted.

In contrast to the first battery unit 230 according to the second embodiment, the first battery unit 330 according to the third embodiment includes a first frame (first accommodation member) 332 and a first lower cover 336. In contrast to the second battery unit 240 according to the second embodiment, the second battery unit 340 according to the third embodiment includes second frames (second accommodation members) 342 and a second lower cover 346. Each of the first frame 332 and the second frames 342 may serve as a part of the vehicle frame. The strength of the first frame 332 is greater than the strength of the second frames 342.

The first battery unit 330 and the second battery unit 340 are, for example, attached to the vehicle floor BF of the vehicle 200. The first battery unit 330 is disposed in an inner region of the vehicle body, and the second battery unit 340 is disposed closer to the outside of the vehicle body than the first battery unit 330. The second battery unit 340 is provided to at least partially surround the first battery unit 330. In one embodiment, the first frame 332 is disposed in an inner region of the vehicle body, and the second frames 342 are disposed closer to the outside of the vehicle body than the first frame 332. The second frames 342 are provided along the outer periphery of the first frame 332 to at least partially surround the first frame 332.

The first frame 332 and the second frames 342 are coupled to the vehicle floor BF by fastening members 350. The first battery unit 330 and the second battery unit 340 according to the third embodiment are suspended from the vehicle floor BF.

The first cells 134 are accommodated in an accommodation space surrounded by the first frame 332, the vehicle floor BF, and the first lower cover 336. The second cells 144 are accommodated in an accommodation space surrounded by the second frames 342, the vehicle floor BF, and the second lower cover 346.

Energy absorption members (second energy absorption members) 338 are provided on an outer surface of the first frame 332. The energy absorption members 338 are not limited to this, and may be provided on an outer surface of one of the second frames 342. The energy absorption members 338 are disposed between the first frame 332 and the second frame 342. Thus, in the third embodiment, the space between the first cells 134 and the second cells 144 contains more than one frames, which are the first frame 332 and one of the second frames 342, and the energy absorption members 338 are provided between the first frame 332 and the second frame 342. Similarly to the second embodiment, the first frame 332 may serve as a part of the vehicle frame that constitutes a vehicle framework of the vehicle 200, and one of the second frames 342 may serve as an EA unit of a side sill or the like.

Referring to FIG. 7B, an object Ob moves in a right-to-left direction in FIG. 7B, which is a left-to-right direction for the vehicle 200, and collides with the left side of the vehicle 200. As illustrated in FIG. 7B, when a battery unit 340 before hitting the first battery unit 330. Accordingly, when a vehicle accident occurs, first, the second battery unit 340 receives a collision load and an impact from the object Ob. When the second battery unit 340 receives the collision load and the impact, one of the second frames 342 is deformed and the gap between this second frame 342 and the second cells 144 is reduced, so that the impact energy is partially absorbed and reduced. When the second frame 342 is deformed and when the gap between the second frame 342 and the second cells 144 is reduced, the entrance acceleration of the object Ob is reduced, and the impact load is reduced accordingly.

Similarly to the above-described first embodiment, the second cells 144 that are separate from each other are provided between the second frames 342 and the energy absorption members 146 (see FIGS. 3A and 3B) are provided between the second cells 144. In one embodiment, second frames 342 may serve as a "second accommodation member". Therefore, the collision load and the impact applied by the object Ob are absorbed and reduced when the energy absorption members 146 are crushed before the second cells 144. If the collision load and the impact applied by the object Ob can be entirely absorbed as a result of the reduction in the gap between one of the second frames 342 and the second cells 144 and the crushing of the energy absorption members 146, the second cells 144 can be protected.

If the collision load and the impact applied by the object Ob cannot be entirely absorbed as a result of the reduction in the gap between one of the second frames 342 and the second cells 144 and the crushing of the energy absorption members 146, the collision load and the impact are partially transmitted to the second cells 144. When the second cells 144 receive the collision load and the impact, the second cells 144 are deformed and crushed, so that the collision load and the impact energy are partially absorbed and reduced.

If the collision load and the impact applied by the object Ob cannot be entirely absorbed as a result of the crushing of the second cells 144, the second battery unit 340 moves toward the first battery unit 330.

When the second battery unit 340 moves toward the first battery unit 330, the second battery unit 340 hits the energy absorption members 338, and the collision load and the impact applied by the object Ob are transmitted to the energy absorption members 338. When the energy absorption members 338 receive the collision load and the impact, the energy absorption members 338 are deformed, so that the impact energy is partially absorbed and reduced. When the energy absorption members 338 are deformed and crushed, the entrance acceleration of the object Ob is reduced, and the impact load is reduced accordingly.

When the second battery unit 340 moves toward the first battery unit 330, the second battery unit 340 hits the first battery unit 330 with the energy absorption members 338 disposed therebetween. The collision load and the impact that have not been absorbed by the crushing of the energy absorption members 338 are transmitted to the first frame 332 of the first battery unit 330. In one embodiment, the first frame 332 may serve as a "vehicle frame". In the present embodiment, the strength of the first frame 332 is greater than the strength of the second frames 342. Therefore, when the collision load is applied from one of the second frames 342 to the first frame 332 through the energy absorption members 338, the first frame 332 is less likely to be deformed than the second frame 342, and the first cells 134 can be protected from damage.

The collision load and the impact transmitted to the first frame 332 are reduced by, for example, the overall motion of the vehicle body including roll motion of the vehicle body; deformations of the front wheels FW, the rear wheels RW, and suspensions; and side slip of the vehicle body.

Also in the third embodiment, the second battery unit 340 including the all-solid-state cells is disposed in the EA space surrounding the first battery unit 330, so that the first battery unit 330 including the liquid cells receives less collision load and impact in case of a vehicle accident. The second battery unit 340 is provided along the outer periphery of the first battery unit 330 to surround the first battery unit 330.

Since the second battery unit 340 is provided in the EA space, the battery capacity of the vehicle 200 can be increased, and the range of the vehicle 200 can be increased accordingly. Even when the second battery unit 340 is damaged due to, for example, a collision, the damaged second battery unit 340 may be replaced without replacing the first battery unit 330 that has been protected. Thus, repair costs can be reduced.

The third embodiment is characterized in that, similarly to the second embodiment, the first frame 332 serves as a part of the vehicle frame of the vehicle 200 and has a strength sufficient to serve as the vehicle frame. The space between the first cells 134 and the second cells 144 is partitioned by the first frame 332 and one of the second frames 342, and the energy absorption members 338 are disposed between the first frame 332 and the second frame 342. Accordingly, the collision load and the impact applied from the second battery unit 340 can be absorbed by the energy absorption members 338, and the first cells 134 can be more easily protected from damage than in the second embodiment.

In the second and third embodiments, the first frames 232 and 332 of the first battery units 230 and 330 serve as a part of the vehicle frame of the vehicle 200. However, the structure is not limited to this. For example, in the first embodiment, a vehicle frame of the vehicle 100 may serve to provide the strength of the first case 132 of the first battery unit 130. An example in which a vehicle frame of the vehicle 100 serves to provide the strength of the first case 132 of the first battery unit 130 in the first embodiment will be described with reference to FIG. 8 as a fourth embodiment.

Fourth Embodiment

Figure 8:
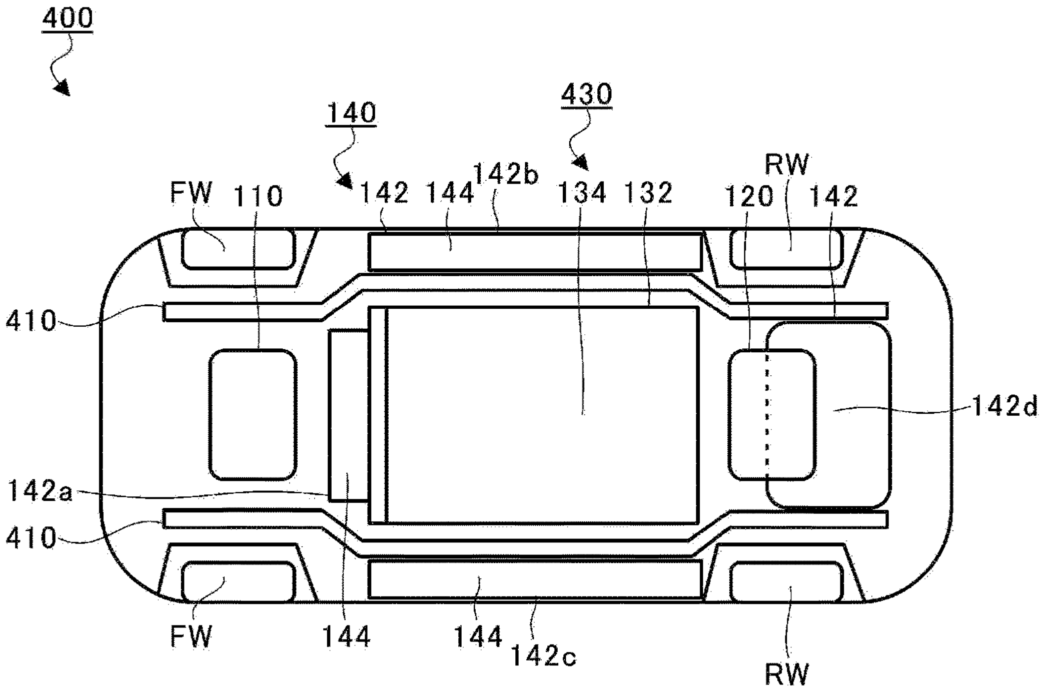
FIG. 8 is a schematic diagram illustrating the structure of a vehicle according to an embodiment.

FIG. 8 is a schematic diagram illustrating the structure of a vehicle 400 according to a fourth embodiment. Components substantially the same as those of the vehicle 100 according to the first embodiment are denoted by the same reference numerals, and description thereof is omitted. The vehicle 400 according to the fourth embodiment includes a first battery unit 430 and a second battery unit 140. The first battery unit 430 includes a vehicle frame 410 that serves as a part of a first accommodation member. The second battery unit 140 has a structure similar to that in the first embodiment.

The first battery unit 430 includes the vehicle frame 410 and a first case 132. The vehicle frame 410 constitutes the first accommodation member that accommodates first cells 134. The vehicle frame 410 is disposed between the first cells 134 and the second cells 144. The vehicle frame 410 is formed by extending a frame of an engine room to a location below the floor. Thus, the vehicle body has sufficient rigidity, and the energy of a front collision can be dispersed, so that there is less danger to occupants.

The first battery unit 430 is disposed in an inner region of the vehicle body, and the second battery unit 140 is disposed closer to the outside of the vehicle body than the first battery unit 430. The second battery unit 140 is provided to at least partially surround the first battery unit 430. In one embodiment, the first case 132 is disposed in an inner region of the vehicle body, and the second case 142 is disposed closer to the outside of the vehicle body than the first case 132. The second case 142 is provided along the outer periphery of the first case 132 to at least partially surround the first case 132.

In the fourth embodiment, the liquid cells, which are less safe than the solid-state cells when damaged, are mounted in the first case 132 disposed inside the vehicle frame 410. The solid-state cells, which are safer than the liquid cells when damaged, are mounted in the second case 142 disposed outside the vehicle frame 410. In the present embodiment, the vehicle frame 410 serves to provide the strength of the first case 132 in the first embodiment. Therefore, in the present embodiment, as long as the strength of the vehicle frame 410 is greater than the strength of the second case 142, the strength of the first case 132 may be equal to the strength of the second case 142. The strength of the first case 132 may be less than or greater than the strength of the second case 142.

Figure 9:
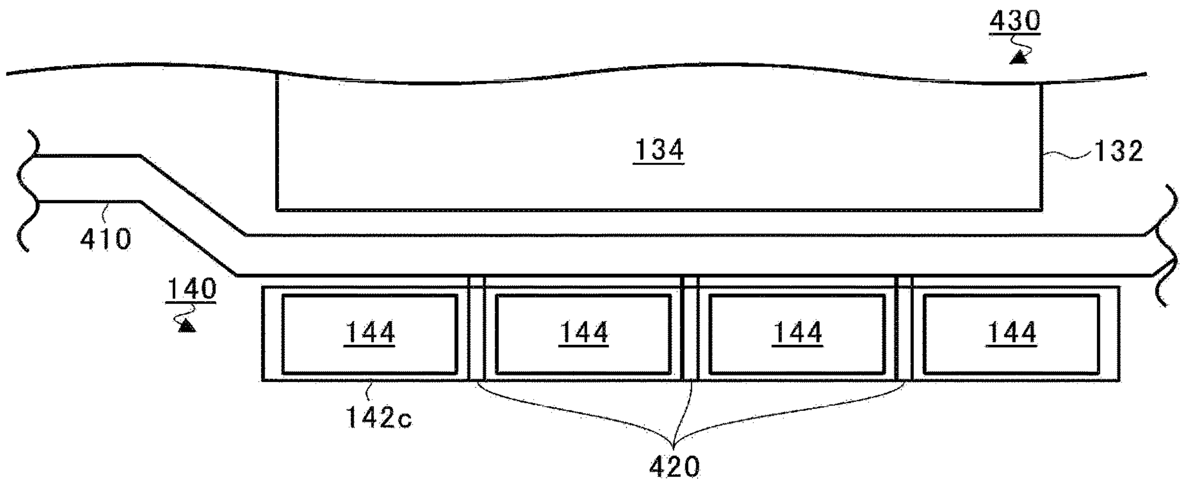
FIG. 9 is a horizontal sectional view of a first battery unit and a second battery unit.

FIG. 9 is a horizontal sectional view of the first battery unit 430 and the second battery unit 140. As illustrated in FIG. 9, coupling members 420, which serve as energy absorption members, are disposed between the vehicle frame 410 and the second case 142. The coupling members 420 are inserted into the second case 142 and disposed between the second cells 144. The coupling members 420 also serve as beams of the second case 142 to increase the strength of the second case 142.

When the second case 142 receives an external force in case of, for example, a collision of the vehicle 400, the coupling members 420 transmit the external force applied to the second case 142 to the vehicle frame 410. Accordingly, the load applied to the second battery unit 140 is absorbed through the vehicle frame 410. The load applied to the second battery unit 140 is transmitted to the vehicle frame 410 while the coupling members 420 are being crushed, so that damage to the second cells 144 can be reduced.

Figure 10A:
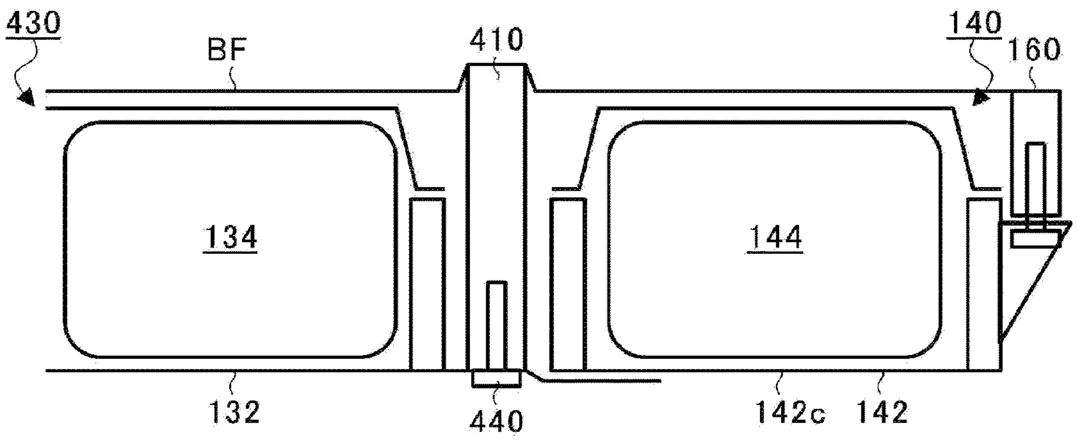
FIG. 10A is a vertical sectional view of the first battery unit and the second battery unit according to the embodiment before collision.
Figure 10B:
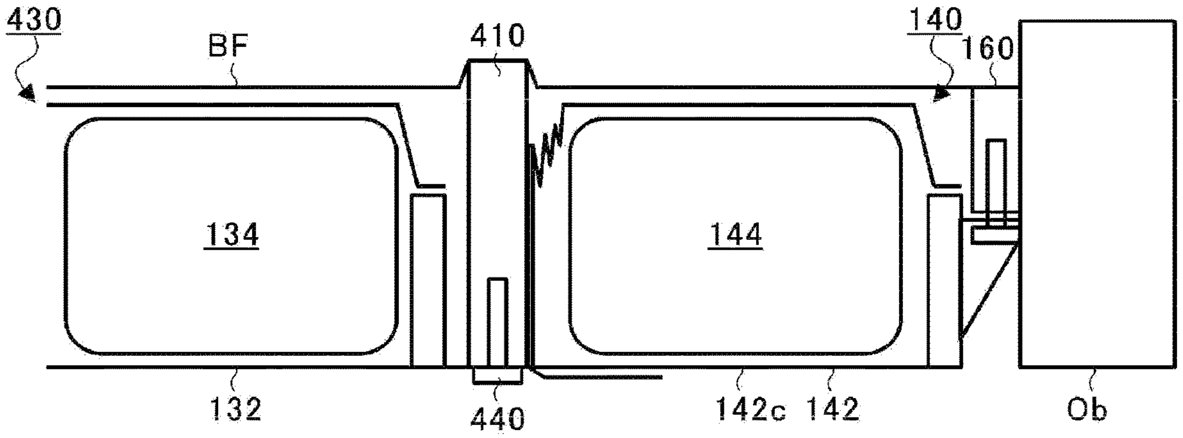
FIG. 10B is a vertical sectional view of the first battery unit and the second battery unit according to the embodiment after collision.

FIG. 10A is a vertical sectional view of the first battery unit 430 and the second battery unit 140 according to the fourth embodiment before collision. FIG. 10B is a vertical sectional view of the first battery unit 430 and the second battery unit 140 according to the fourth embodiment after collision. FIG. 9 and FIGS. 10A and 10B are a horizontal sectional view and vertical sectional views, respectively, of the same first battery unit 430 and the same second battery unit 140 according to the fourth embodiment.

The vehicle frame 410 is provided below the vehicle floor BF. The first battery unit 430 is coupled to the vehicle frame 410 by a fastening member 440, and the second battery unit 140 is coupled to the vehicle floor BF by a joining member 160 provided outside the vehicle frame 410. Thus, the first battery unit 430 and the second battery unit 140 according to the fourth embodiment are suspended from the vehicle floor BF.

Referring to FIG. 10B, an object Ob moves in a right-to-left direction in FIG. 10B, which is a left-to-right direction for the vehicle 400, and collides with the left side of the vehicle 400. As illustrated in FIG. 10B, when a battery unit 140 before hitting the first battery unit 430. Accordingly, when a vehicle accident occurs, first, the second battery unit 140 receives a collision load and an impact from the object Ob. When the second battery unit 140 receives the collision load and the impact, the second case 142 is deformed and the gap between the second case 142 and the second cells 144 is reduced, so that the impact energy is partially absorbed and reduced. When the second case 142 is deformed and when the gap between the second case 142 and the second cells 144 is reduced, the entrance acceleration of the object Ob is reduced, and the impact load is reduced accordingly.

The collision load and the impact applied by the object Ob are transmitted to the coupling members 420 (see FIG. 9) in the second case 142. When the coupling members 420 receive the collision load and the impact, the coupling members 420 are deformed and crushed, so that the impact energy is partially absorbed and reduced. When the coupling members 420 are deformed and crushed, the entrance acceleration of the object Ob is reduced, and the impact load is reduced accordingly. If the collision load and the impact applied by the object Ob can be entirely absorbed as a result of the reduction in the gap between the second case 142 and the second cells 144 and the crushing of the coupling members 420, the second cells 144 can be protected.

If the collision load and the impact applied by the object Ob cannot be entirely absorbed as a result of the reduction in the gap between the second case 142 and the second cells 144 and the crushing of the coupling members 420, the collision load and the impact are partially transmitted to the second cells 144. When the second cells 144 receive the collision load and the impact, the second cells 144 are deformed and crushed, so that the collision load and the impact energy are partially absorbed and reduced.

If the collision load and the impact applied by the object Ob cannot be entirely absorbed as a result of the crushing of the second cells 144, the second battery unit 140 moves toward the first battery unit 430.

When the second battery unit 140 moves toward the first battery unit 430, the second battery unit 140 hits the vehicle frame 410, and the collision load and the impact are transmitted to the vehicle frame 410. Accordingly, the first case 132 of the first battery unit 430 does not directly receive the collision load and the impact applied by the object Ob, so that the first case 132 and the first cells 134 disposed in the first case 132 can be protected. The collision load and the impact transmitted to the vehicle frame 410 are reduced by, for example, the overall motion of the vehicle body including roll motion of the vehicle body; deformations of the front wheels FW, the rear wheels RW, and suspensions; and side slip of the vehicle body.

The fourth embodiment is characterized in that the vehicle frame of the vehicle 100 serves to provide the strength of the first case 132 of the first battery unit 130 in the first embodiment. Accordingly, the collision load and the impact applied from the second battery unit 140 are transmitted to the vehicle frame 410, and the first cells 134 can be protected from damage.

In the first to fourth embodiments, deformation and breakage of the second cells 144 are tolerated for the sake of protecting the first cells 134 from damage. However, the structure is not limited to this, and the first cells 134 may be protected from damage while damage to the second cells 144 is made as small as possible. An example in which the first cells 134 are protected from damage while damage to the second cells 144 is made as small as possible will be described with reference to FIGS. 11A and 11B as a fifth embodiment.

Fifth Embodiment

Figure 11A:
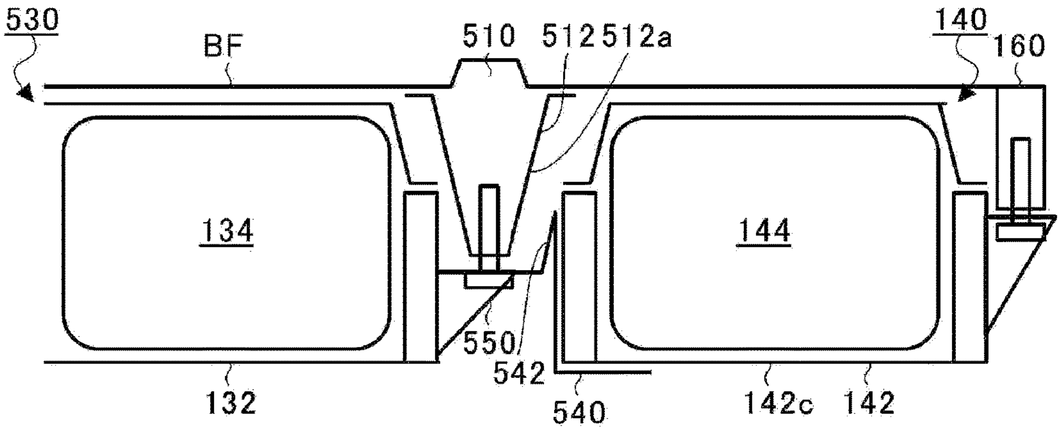
FIG. 11A is a vertical sectional view of a first battery unit and a second battery unit according to an embodiment before collision.
Figure 11B:
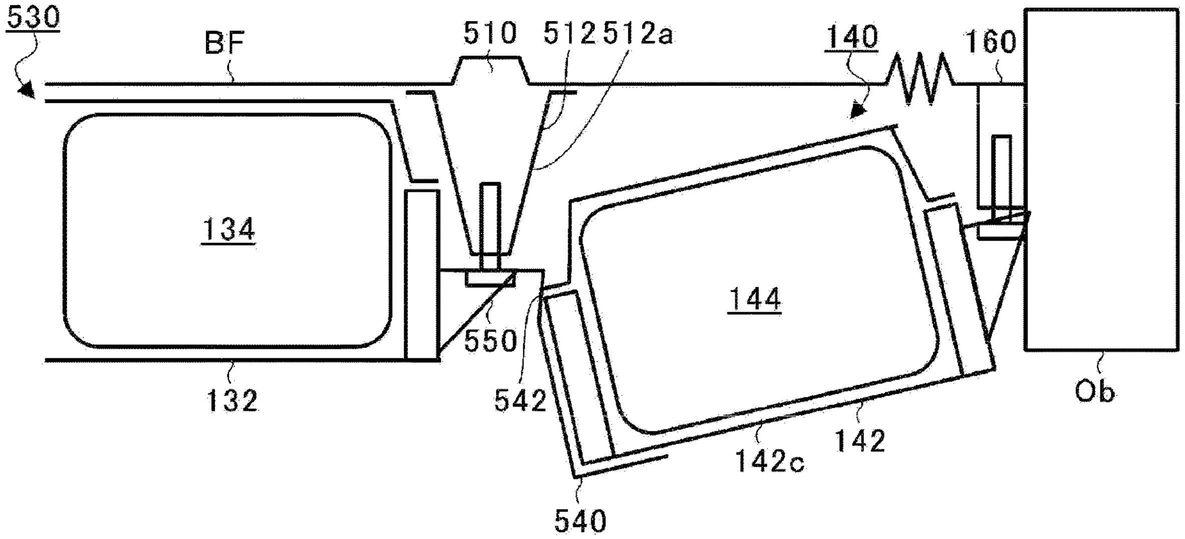
FIG. 11B is a vertical sectional view of the first battery unit and the second battery unit according to the embodiment after collision.

FIG. 11A is a vertical sectional view of a first battery unit 530 and a second battery unit 140 according to the fifth embodiment before collision. FIG. 11B is a vertical sectional view of the first battery unit 530 and the second battery unit 140 according to the fifth embodiment after collision.

The fifth embodiment may be applied in combination with various structures described in the first, second, third, and fourth embodiments. For example, the fifth embodiment may be applied as a mechanism for protecting any of the first battery units 130, 230, 330, and 430 provided in the vehicle bodies according to the first, second, third, and fourth embodiments. In other words, the fifth embodiment may be applied in combination with any of the first battery units 130, 230, 330, and 430 according to the first, second, third, and fourth embodiments. Here, an example in which the fifth embodiment is applied to the structure of the fourth embodiment will be described. In the fifth embodiment, structures other than the structures of a vehicle frame 510 and a support mechanism 540 described below are the same as those in the fourth embodiment. Components substantially the same as those of the vehicle 400 according to the fourth embodiment are denoted by the same reference numerals, and description thereof is omitted.

The first battery unit 530 includes the vehicle frame 510 and a first case 132. The vehicle frame 510 that accommodates first cells 134. In one embodiment, the vehicle frame 510 may serves as a "first accommodation member". The vehicle frame 510 is provided between the first cells 134 and the second cells 144. The vehicle frame 510 is provided below the vehicle floor BF. The vehicle frame 510 includes an inclination member 512 having a width that decreases with increasing distance from the vehicle floor BF in a vertically downward direction. The first battery unit 530 is coupled to the vehicle frame 510 by a joining member 550.

The second battery unit 140 is coupled to the vehicle floor BF by a joining member 160 provided outside the vehicle frame 510 at a location distant from the first battery unit 530 and the vehicle frame 510. The second battery unit 140 is coupled to the vehicle frame 510 by the support mechanism 540 and the joining member 550 at a location adjacent to the first battery unit 530 and the vehicle frame 510.

The support mechanism 540 is attached to the vehicle frame 510 by the joining member 550, and supports the second battery unit 140 at a location adjacent to the vehicle frame 510. The support mechanism 540 includes a deformable member 542 that is bendable and extendable and whose state changes from a bent state to an extended state when an external force is applied to the second battery unit 140 in case of, for example, a collision of the vehicle 400.

As illustrated in FIG. 11A, before collision, the support mechanism 540 supports the second battery unit 140 at a location adjacent to the vehicle frame 510, and the deformable member 542 is maintained in the bent state.

Referring to FIG. 11B, an object Ob moves in a right-to-left direction in FIG. 11B, which is a left-to-right direction for the vehicle 400, and collides with the left side of the vehicle 400. As illustrated in FIG. 11B, when a vehicle accident occurs, the object Ob hits the second battery unit 140 before hitting the first battery unit 530. Accordingly, when a vehicle accident occurs, first, the second battery unit 140 receives a collision load and an impact from the object Ob. When the second battery unit 140 receives the collision load and the impact, the second case 142 is deformed and the gap between the second case 142 and the second cells 144 is reduced, so that the impact energy is partially absorbed and reduced. When the second case 142 is deformed and when the gap between the second case 142 and the second cells 144 is reduced, the entrance acceleration of the object Ob is reduced, and the impact load is reduced accordingly.

If the collision load and the impact applied by the object Ob cannot be entirely absorbed as a result of the reduction in the gap between the second case 142 and the second cells 144, the second battery unit 140 moves toward the first battery unit 530. If the collision load and the impact applied by the object Ob cannot be entirely absorbed as a result of the reduction in the gap between the second case 142 and the second cells 144 and the crushing of the coupling members 420, the collision load and the impact may be partially transmitted to the second cells 144. In such a case, the second cells 144 may receive the collision load and the impact and be deformed and crushed so that the collision load and the impact energy are partially absorbed and reduced.

When the second battery unit 140 moves toward the first battery unit 530, the second battery unit 140 hits the vehicle frame 510, and the collision load and the impact applied by the object Ob are partially transmitted to the vehicle frame 510. The collision load and the impact transmitted to the vehicle frame 510 are reduced by, for example, the overall motion of the vehicle body including roll motion of the vehicle body; deformations of the front wheels FW, the rear wheels RW, and suspensions; and side slip of the vehicle body.

The second case 142 of the second battery unit 140 hits the inclination member 512 of the vehicle frame 510 provided below the vehicle floor BF. The inclination member 512 has an inclined surface 512*a* adjacent to the second battery unit 140. The inclined surface 512*a* is inclined such that the distance from the second battery unit 140 increases with increasing distance in the vertically downward direction.

Therefore, when the second battery unit 140 hits the inclined surface 512*a* of the vehicle frame 510, the impact energy is partially absorbed by the vehicle frame 510, and the inclined surface 512*a* changes the direction of movement of the second battery unit 140 from a horizontal direction toward the vertically downward direction. At this time, the state of the deformable member 542 of the support mechanism 540 changes from the bent state to the extended state. Accordingly, the second battery unit 140 is rotated so that the second battery unit 140 is inclined respect to a direction of the collision load. In response to the change in the state of the deformable member 542 of the support mechanism 540, the second case 142 of the second battery unit 140 rotates such that the second case 142 is inclined respect to the direction of the collision load. Thus, the inclined surface 512*a* of the vehicle frame 510 changes the direction of movement of the second battery unit 140, so that damage to the second cells 144 in the second battery unit 140 can be reduced.

The support mechanism 540 allows a vertically downward movement of the second battery unit 140 by causing deformation of the deformable member 542 from the bent state to the extended state, and also supports the second battery unit 140 so that the second battery unit 140 does not fall.

The fifth embodiment is characterized in that the first cells 134 are protected from damage and that the support mechanism 540 is provided so that damage to the second cells 144 is made as small as possible. Thus, the first cells 134 can be protected from damage while damage to the second cells 144 is made as small as possible.

Although embodiments of the disclosure have been described with reference to the accompanying drawings, the disclosure is, of course, not limited to the above-described embodiments. It is obvious that various alterations and modifications are conceivable by those skilled in the art within the scope defined by the claims, and such alterations and modifications are to be understood as being included in the technical scope of the disclosure.

In the above-described embodiments, the energy absorption members 146 are provided between the second cells 144. However, the energy absorption members 146 may be omitted, and the second cells 144 may have no energy absorption members 146 provided therebetween.

In the above-described embodiments, the energy absorption members 136 are provided between the first case 132 and the second case 142. However, the energy absorption members 136 may be omitted, and the first case 132 and the second case 142 may have no energy absorption members 136 provided therebetween.

In the above-described embodiments, the energy absorption members 338 are provided between the first frame 332 and one of the second frames 342. However, the energy absorption members 338 may be omitted, and the first frame 332 and the second frame 342 may have no energy absorption members 338 provided therebetween.

According to the disclosure, the battery disposed in the EA space can be protected, and the range can be increased.

The invention claimed is:

1. A vehicle comprising:

a motor;

a first accommodation member configured to accommodate a first cell configured to supply electric power to the motor; and a second accommodation member configured to accommodate a second cell configured to supply electric power to the motor, the second accommodation member being disposed so as to cover at least a part of the first accommodation member, wherein a strength of the first accommodation member is greater than a strength of the second accommodation member, and wherein the second accommodation member is configured to, when the second accommodation member receives a collision load, rotate such that the second accommodation member is inclined with respect to a direction of the collision load.

2. The vehicle according to claim 1, wherein the second cell is an all-solid-state cell.

3. The vehicle according to claim 2, wherein the first cell is a liquid cell.

* * * * *